United States Patent [19]
Akaza et al.

[11] Patent Number: 5,739,823
[45] Date of Patent: Apr. 14, 1998

[54] GRAPH DISPLAY DEVICES

[75] Inventors: Shunsuke Akaza, Tachikawa; Akihiro Handa, Ome; Hidekazu Tanaka; Makoto Ozawa, both of Akishima; Kazuhiko Arikawa, Fussa, all of Japan

[73] Assignee: Casio Computer Co., Ltd., Tokyo, Japan

[21] Appl. No.: 510,792

[22] Filed: Aug. 3, 1995

[30] Foreign Application Priority Data

Aug. 12, 1994 [JP] Japan ................... 6-190377
Dec. 22, 1994 [JP] Japan ................... 6-320740
Dec. 22, 1994 [JP] Japan ................... 6-320872

[51] Int. Cl.⁶ .................................. G06F 15/00
[52] U.S. Cl. .................................. 345/440
[58] Field of Search ................. 395/140, 326, 395/131; 345/150, 151

[56] References Cited

U.S. PATENT DOCUMENTS 4,686,521  8/1987  Beaven et al. ................ 340/703
5,581,677  12/1996 Myers et al. ................... 395/140

FOREIGN PATENT DOCUMENTS

88/01778  3/1988  WIPO.

OTHER PUBLICATIONS

Mathematica, A System for Doing Mathematics by Computer, Second Edition, Addision-Wesley Publishing Company, Inc., Stephen Wolfram, Redwood City, California, 1991, pp. 134–135, 407–408.

Mathcad, User's Guide, Feb., 1992, Mathsoft, Inc., Cambridge, Mass. pp. 300–321, 234–239.

Primary Examiner—Phu K. Nguyen
Attorney, Agent, or Firm—Frishauf, Holtz, Goodman, Langer & Chick

[57] ABSTRACT

A graph display device which includes an expression input section for inputting functional expression data, an expression color setting for setting a display color for the functional expression data input by the expression input section, and an expression display section for displaying the input functional expression data in the display color set by the expression color setting section. A graph producing section produces a graph for the functional expression data input by the expression input section based on the input functional expression data, and a graph display section display the graph produced by the graph producing section in the same display color as that set for the functional expression data.

7 Claims, 14 Drawing Sheets

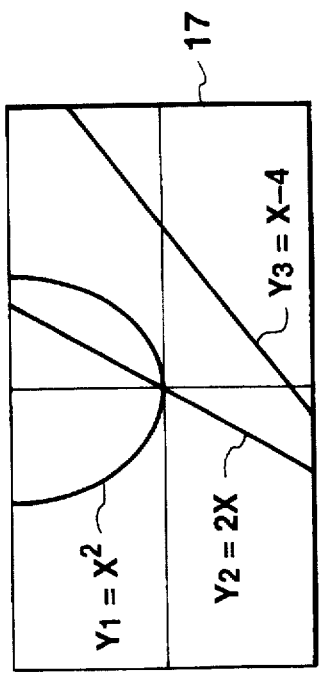
FIG.4A
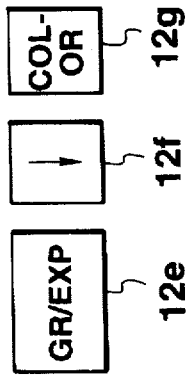
FIG.4B
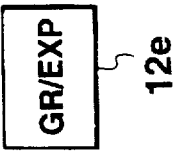
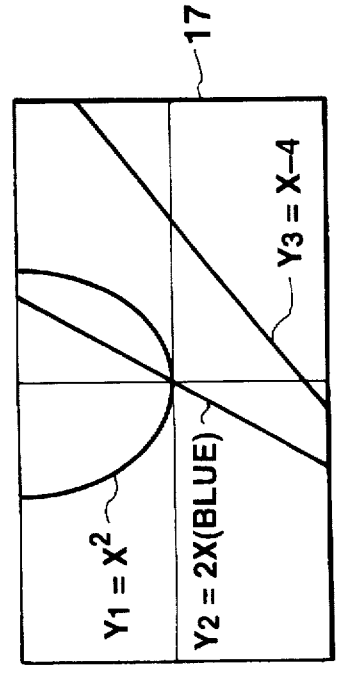
FIG.4C

INPUT EXPRESSIONS
FIG.10A
K
(GREEN) { $Y_1 = X$
$Y_2 = X^2 - 2$
$Y_3$
$Y_4$
$Y_5$ }  17
---
FIG.10B
[↑] 12f   [COLOR] 12g
(BLUE) → $Y_1 = X$  K
(GREEN) { $Y_2 = X^2 - 2$
$Y_3$
$Y_4$
$Y_5$ }  17
---
FIG.10C
[GRAPH] 12d
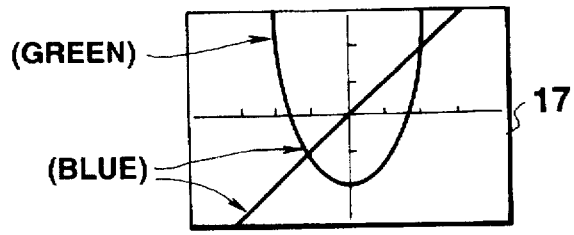
(GREEN)
(BLUE)
17
---
FIG.10D
[GR/EXP] 12e   CURSOR MOVE   [≧]
(BLUE) $Y_1 = X$
$Y_2 \geq \underline{X}^2 - 2$
(GREEN) { $Y_3$
$Y_4$
$Y_5$ }  17
---
FIG.10E
[GRAPH] 12d
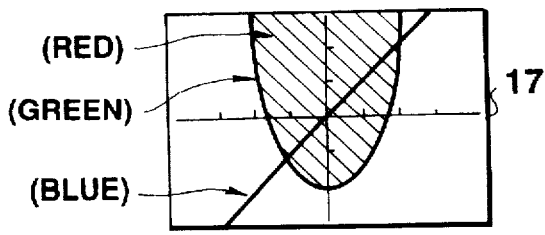
(RED)
(GREEN)
(BLUE)
17

INPUT EXPRESSIONS
TO BE GRAPHED
FIG.11A
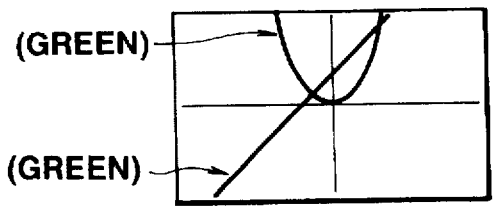
FIG.11B
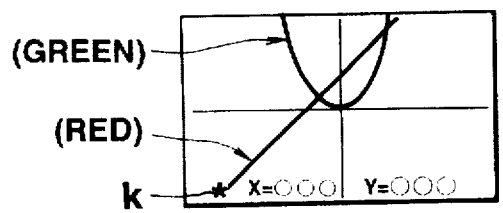
FIG.11C
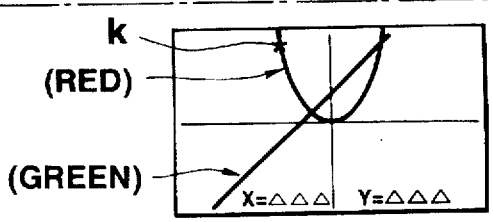
FIG.11D
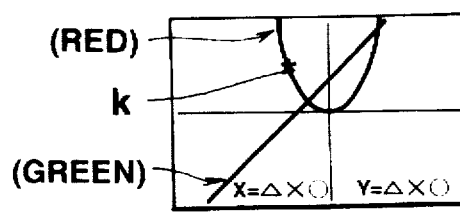
FIG.11E

INPUT EXPRESSIONS
TO BE GRAPHED
FIG.12A
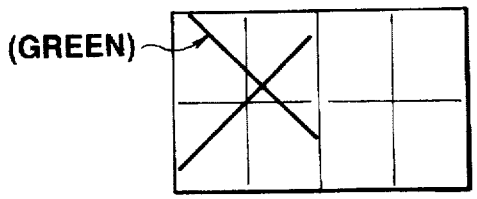
FIG.12B
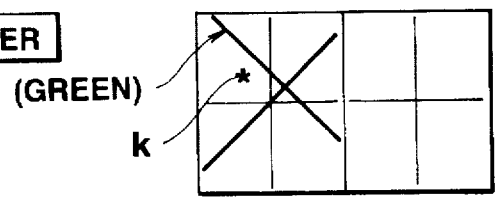
FIG.12C
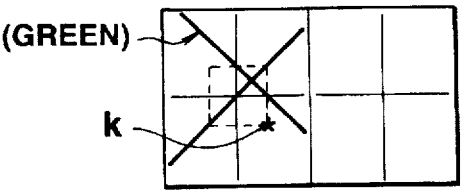
FIG.12D
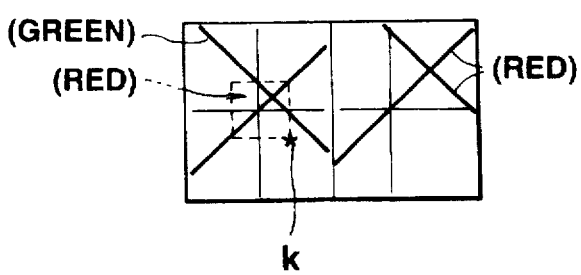
FIG.12E

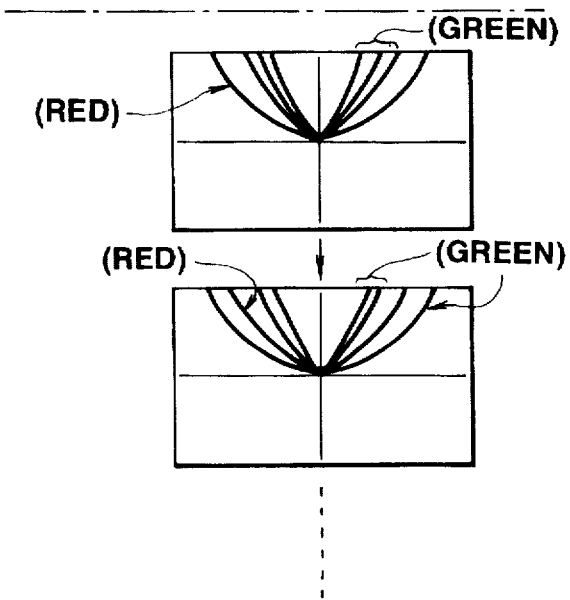
FIG.13A INPUT EXPRESSION TO BE GRAPHED
$Y_1 = AX^2$
$Y_2$
$Y_3$
$Y_4$
$Y_5$
FIG.13B INPUT STARTING AND ENDING VALUES AND INTERVAL OF CHANGE
A
START : 1
END : 4
INTERVAL : 1
FIG.13C GRAPH
(GREEN)
(RED)
(RED) (GREEN)

☐ ANSWER

5+3
(8) -- RED

GRAPH DISPLAY DEVICES

BACKGROUND INVENTION

1. Field of the Invention

The present invention relates to graph display devices such as electronic computers which display graphs based on input functional expression data, and more particularly to a graph display device which displays a plurality of graphs in respective designated colors.

2. Description of the Related Art

Conventionally, electronic computers such as calculators which graph and display input functional expression data have been put to practical use.

In an electronic computer of this kind, when data on a functional expression such as Y=f(X) is input, specified values corresponding to a range of display on the display are substituted into the functional expression and the value of the expression is calculated, graph plotting data is produced and displayed as a graph. In this case, in the conventional electronic computer, especially in a graph calculator, the input functional expression and its graph data are all displayed in the same black color on a white background of a liquid crystal display.

As in the conventional computer, however, when the input functional expressions and graph data are displayed simultaneously, for example, when a plurality of functional expressions are input and the corresponding graph data are displayed together, the respective graphic data are very difficult to discriminate. Also, when various kinds of graphic data are displayed in a mixed manner, the respective graphic data are very difficult to discriminate.

SUMMARY OF THE INVENTION

It is therefore an object of the present invention to provide a graph display device which is capable of displaying together, for example, even respective graph data corresponding to functional expressions, if any, in a very distinctly plain manner.

In order to achieve the above object, the present invention provides a graph display device comprising:

expression input means for inputting functional expression data;

graph data calculation means for calculating graph data on the basis of the functional expression data input by the expression input means;

color designation means for designating a display color of the graph data calculated by the graph data calculation means; and graph display means for displaying the calculated graph data in a displayed color designated by the color designation means.

By such arrangement, even when a plurality of graphs are displayed, they can be clearly and easily discriminated.

BRIEF DESCRIPTION OF THE DRAWINGS

FIGS. 4A, B and C each show a display state corresponding to keying operations involved in the function operation of the computer;

FIGS. 10A, B, C, D and E each show a graph display state corresponding to a key-in operation performed in a graph display mode in the graph display device;

FIGS. 11A, B, C, D and E each show a graph display state corresponding to a key-in operation performed in a graph display mode in the graph display device;

FIGS. 12A, B, C, D and E each show a graph display state corresponding to a key-in operation performed in a graph enlargement mode in the graph display device;

FIGS. 13A, B and C each show a graph display state corresponding to a key-in operation performed in a dynamic graph mode in the graph display device; and FIGS. 14A and B each show a display state corresponding to a key-in operation performed in a calculation process in the graph display device.

DESCRIPTION OF THE PREFERRED EMBODIMENTS

Preferred embodiments of a graph display device according to the present invention will be described below.

Figure 1:
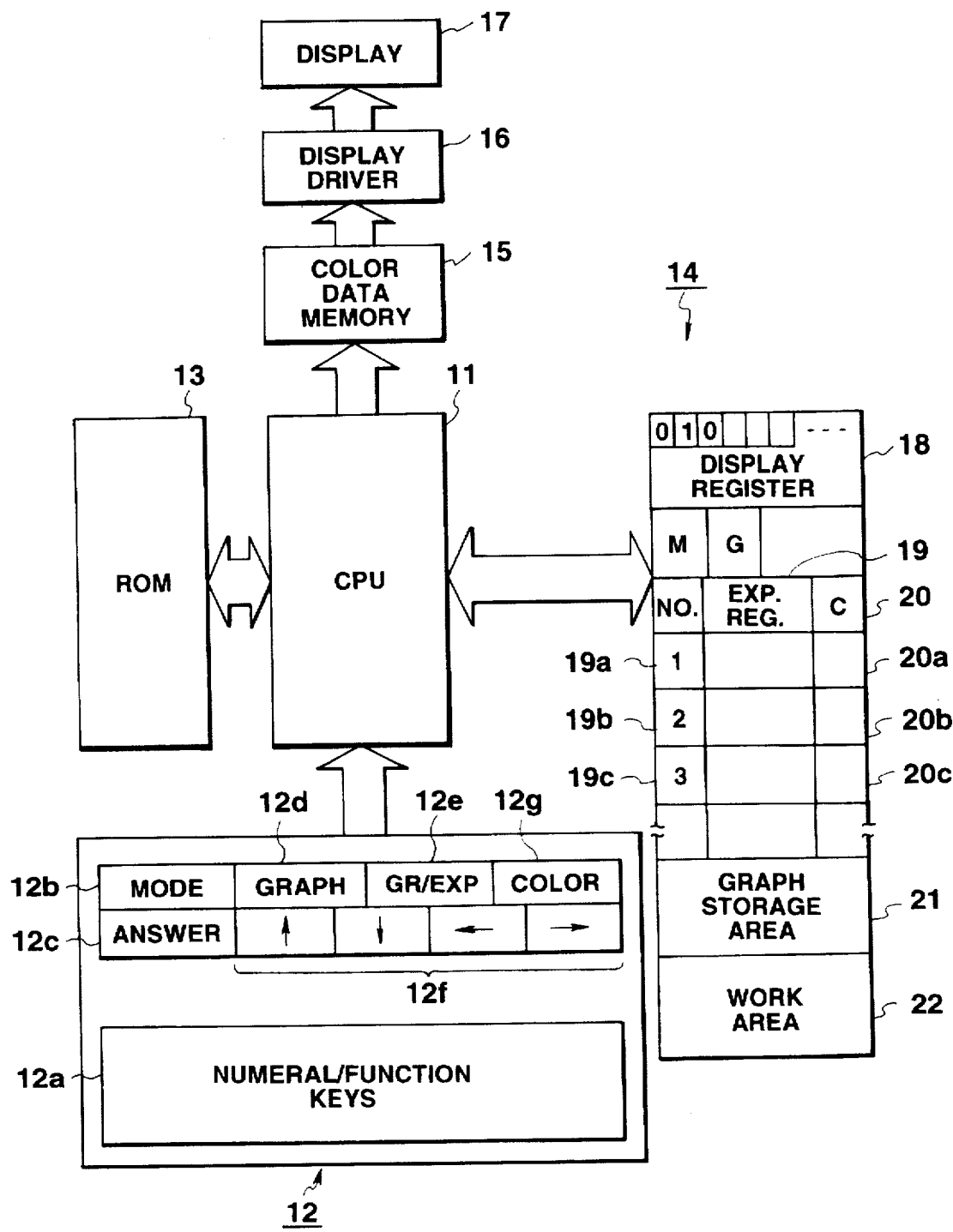
FIG. 1 is a block diagram indicative of the structure of an electronic circuit of a small electronic computer with a graph display function as an embodiment of a graph display device according to the present invention.

FIG. 1 is a block diagram indicative of the structure of an electronic circuit of a small electronic computer which embodies a graph display device according to the present invention. The computer includes a CPU 11, which starts up a system program stored beforehand in a ROM 13 in accordance with a signal keyed in by a key-in unit 12 to control the operations of the respective elements concerned of the graph display device. In addition to the key-unit 12 and the ROM 13, the CPU 11 is connected to a RAM 14 and also to a color liquid crystal display 17 through a color data memory 15 and a display driver 16.

The key-in unit 12 has numeral keys and function keys 12a operated when a desired expression such as an arithmetic expression, a functional expression or otherwise a functional inequality is input; a "mode" key 12b operated when a calculation, function or inequality operation mode is selected; an "answer" key 12c operated when an arithmetic operation based on an input calculation expression input in the calculation mode is performed and the calculated data is displayed; a "graph" key 12d operated when graph data corresponding to an input function expression/functional inequality is calculated and displayed in the function or inequality operation mode; a "graph/expression" key 12e operated when one of the input expression and graph data display states is selected in the function or inequality operation mode; a cursor key 12f operated when display data is selected or designated; and a color key 12g operated when the display colors of an input expression selected by the cursor key 12f and its graph data are changed selectively in the displayed state of the input expression in the function or inequality operation mode.

The ROM 13 contains a system program which provides control over the whole operation of the electronic computer and subprograms which control the operations of the computer in the respective calculation, function and inequality operation modes.

The RAM 14 includes a display register 18 which has an area of data storage locations which correspond to display dots in the display area of the display 17 in a one-to-one relationship, wherein display data is stored in the form of a bit map where display data "1" implies lighting (corresponding to black display) and display data "0" implies an unlighted state (corresponding to white display); a mode flag register M which is set at "0" in the calculation mode, at "1" in the function operation mode, and at "2" in the inequality operation mode; a graph/expression flag register G which is set at "0" in the display state of an input expression in the function or inequality operation mode and set at "1" in the display state of graph data corresponding to the input expression; expression registers 19 (19a, b, c, . . . ) which store input expressions individually; designated color registers (C) 20 (20a, b, c, . . . ) which store displayed designated colors of the input expressions stored in the expression registers 19 as "0" (unlighted), "1" (black), "2" (blue) and "3" (red); a graph storage area 21 which stores graph data on the respective input expressions stored in the registers 19 as the bit map data corresponding to the displayed patterns; and a work area 22 which temporarily stores various data input/output by various control operations performed by the CPU 11.

The color data memory 15 has an area of data storage locations corresponding to the respective display dots in a one-to-one relationship in the display area of the display 17 like the display register 18 of the RAM 14 and stores the respective displayed dot data as values "0", "1", "2", "3" and "4" corresponding to the displayed colors "unlighted", "black", "blue", "red", and "green", respectively. For example, when data stored in the display register 18 of the RAM 14 is designated as "black" display, respectively, display dot data set at "1" in correspondence to the corresponding lighting positions are transferred intact to the color data memory 15 and displayed in black on the display 17 through the display driver 16.

When an input expression is stored, "1" indicative of black display is first set in the designated colors register (C) 20 corresponding to the expression registers 19 of the RAM 14.

For example, when an input expression or its graph data is displayed in the function or inequality operation mode and the corresponding designated color register (C) 20 is changed to and set at "2" which designates blue display, the respective display dot data "1" of the display input expression or graph data written in the display register 18 is converted to date "2", which is then transferred and stored to and in the color data memory 15 and displayed in blue on the display 17 through the display driver 16.

Figure 2:
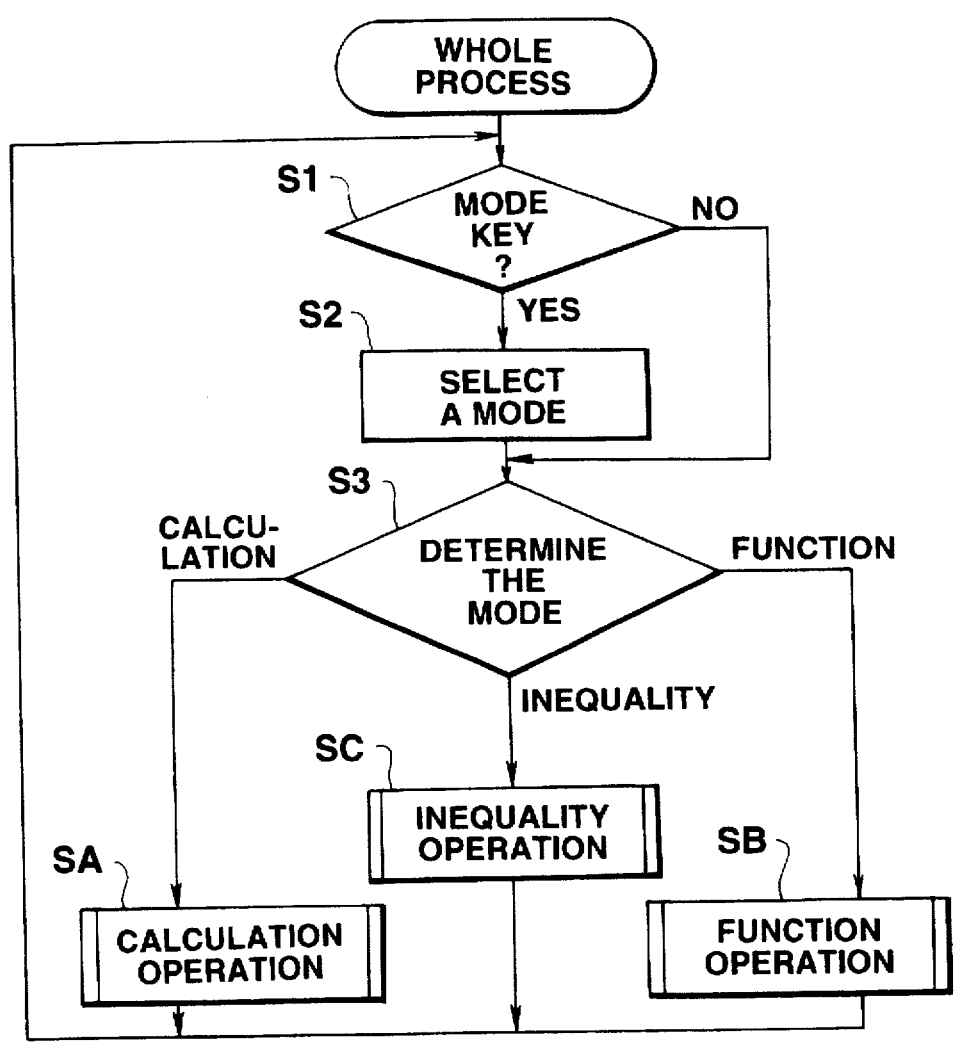
FIG. 2 is a flow chart indicative of the whole operation performed by the graph display.

The operation of the small electronic computer will be described next. FIG. 2 is a flow chart indicative of the whole processing performed by the computer. Each time the "mode" key 12b of the key-in unit 12 is operated, a mode flag set in the mode flag register M of the RAM 14 is changed in order of "0", "1", "2", . . . , so that the corresponding operational mode of the CPU 11 is selected and set (steps S1, S2).

When the mode flag register M is set at "0", the CPU 11 is set at the calculation mode (step S3, SA). When the mode flag register M is set at "1", the CPU 11 is set at the function operation mode (steps S3, SB), and when the mode flag register M is set at "2", the CPU 11 is set at the inequality operation mode (steps S3, SC).

Figure 3:
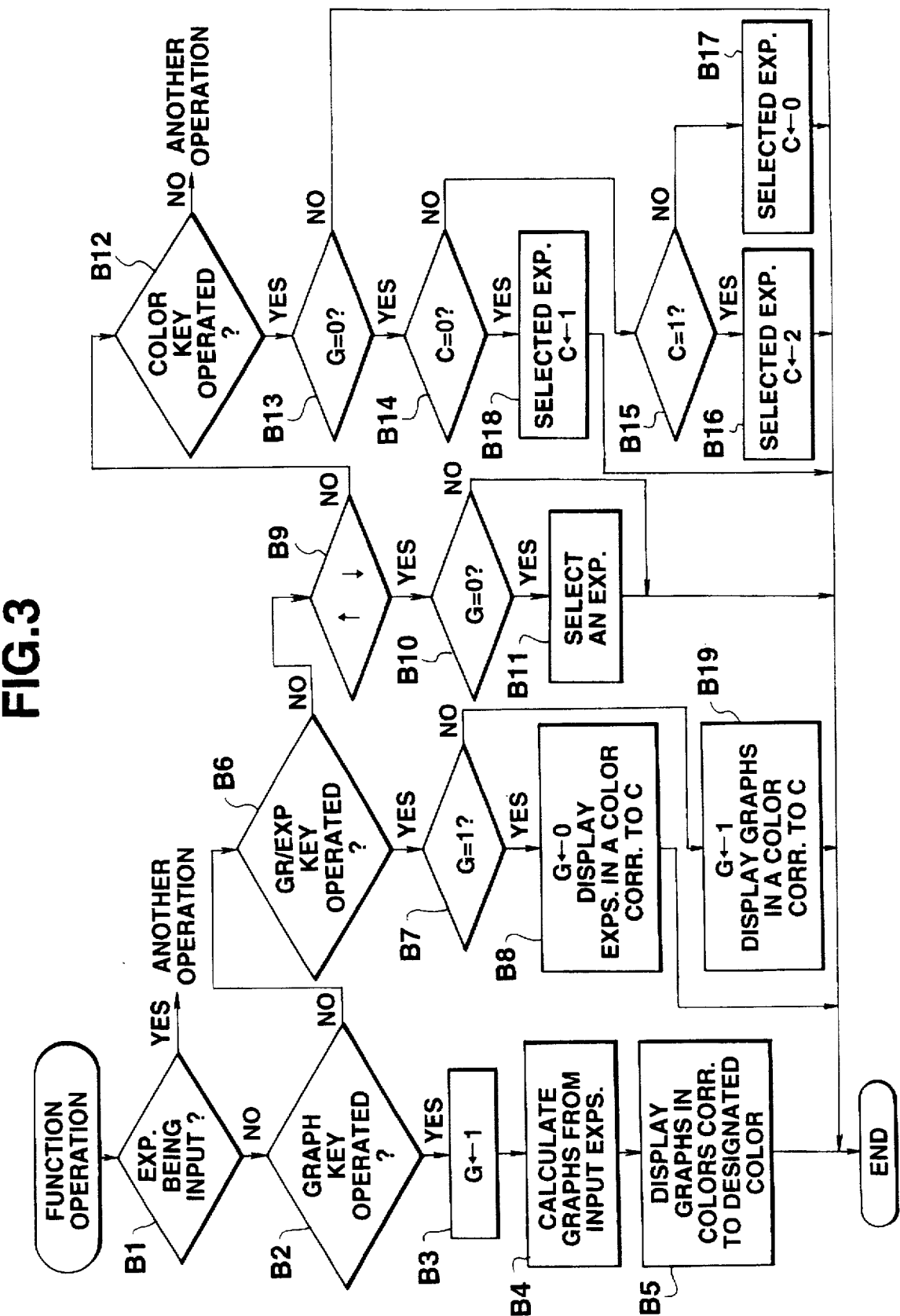
FIG. 3 is a flow chart indicative of a function operation performed by the computer.

FIG. 3 is a flow chart indicative of the function operation performed by the computer. FIG. 4 shows a displayed state indicative of the key-in operation involved in the function operation process performed by the computer.

When the numeral and functional keys 12a of the key-in unit 12 are operated to input, for example, three functional expressions "Y1=$X^2$", "Y2=2X", "Y3=X−4", data on those three input functional expressions are store in the expression registers 19a, 19b and 19c of the RAM 14 (step B1, another operation). When the graph key 12d is then operated, a graph display flag "1" is set in the graph/expression flag register G (steps B1, B2, B3).

Data "1" (black display) is first set in each of the designated color registers (C) 20a–20c corresponding to the expression registers 19a–19c, respectively. In response to this operation, graph data based on the respective input functional expressions "Y1=$X^2$", "Y2=2X", "Y3=X−4" stored in the expression registers 19a–19c, respectively, are calculated by the CPU and extended as bit map data in the graph storage area 21 (step B4).

Thus, graph data corresponding to the input functional expressions "Y1=$X^2$", "Y2=2X", "Y3=X−4" are written together into the display register 18, all the displayed dot data is transferred intact to the color data memory 15 in accordance with display color "1" (black display) designated by the designated color registers (C) 20a–20c and as shown in FIG. 4A, displayed in black graphs on the display 17 (step B5).

When the "graph/expression" key 12e of the key-in unit 12 is operated at this point in time, it is determined that a graph display flag "1" is set at present in the graph/ expression flag register G of the RAM 14. Thus, an expression display flag "0" is set in graph/expression flag register G, the respective input functional expressions "Y1=$X^2$", "Y2=2X", "Y3=X−4" are (1) written into the display register 18, (2) transferred intact to the color data memory in accordance with a display color "1" (black display) designated by the respective designated color registers (C) 20a–20c corresponding to those expressions and (3) displayed in black on the display 17 (steps B6–B8).

When the cursor key 12f is operated, it is confirmed on the basis of the graph/expression flag register G that the display state of the input expressions is G=0. Each time the cursor key 12f is operated, data on an expression selection frame is moved from the display register 18 through the color data memory 15 such that the frame selectively encloses and displays one of the three functional expressions "Y1=$X^2$", "Y2=2X", "Y3=X−4" displayed on the display 17 sequentially this order. In this case, the input functional expression Y2=2X is selected in FIG. 4B (steps B9–B11).

When the color key 12g is operated to change the displayed designated color for the selected functional expression "Y2=2X", it is confirmed on the basis of the graph/ expression flag register G that the display state of the input expression is G=0 and it is determined that data "1" (black display) is set at present in the designated color register (C) 20b corresponding to the selected functional expression "Y2=2X". Thus, the designated color data in the designated color register "C" 20b is changed to "2" (blue display) (steps B12–B16).

Thus, of display data indicative of the input three input functional expressions transferred to the color data memory 15 from the display register 18 and displayed is converted, only the displayed dot data which constitute the functional expression "Y2=2X" selected by the operation of the cursor key and the expression selection frame is converted to data "2" (blue display), which is then transferred to the color data memory 15. Thus, as shown in FIG. 4B, the selected functional expression "Y2=2X" is displayed in blue along with its expression selection frame on the display 17.

When the color key 12g of the key-in unit 12 is again operated, designated color data set in the designated color register (C) 20b corresponding to the selected functional expression "Y2=2X" is determined to be neither "0" nor "1". Thus, the designated color data in the designated color register (C) 20b is changed to data "0" (unlighted), which is then set (steps B12–B15, B17).

In this case, only the displayed dot data which constitutes the functional expression "Y2=2X" selected by the cursor key and its expression selection frame are change to data "0" (unlighted), which is then transferred to the color data memory 15, and the selected functional expression "Y2=2X" and its expression selection frame are displayed in an inverted fashion on the display 17.

Further, when the color key 12g of the key-in unit 12 is again operated, the designated color data set in the designated color register (C) 20b corresponding to the selected functional expression Y2=2X is determined to be "0" (unlighted). Thus, the designated color data in the designated color register (C) 20b is changed to data "1" (black display) and set (steps B12–B14, B18).

In this case, only the displayed dot data which constitutes the selected functional expression "Y2=2X" and its expression selection frame is again converted to data "1" (black display), which is then transferred to the color data memory 15, so that the selected functional expression "Y2="2X" and its expression selection frame are displayed in black on the display 17.

Each time the "color" key 12g is operated, the designated color data corresponding to the currently selected functional expression is changed sequentially in order of "1" (black), "2" (blue), "0" (unlighted or inverted), and "1" (black), and its selection functional expression and expression selection frame are changed and displayed in order of black, blue, inverted and black (steps B9–B18).

When in step B16 data "2" (blue display) is set in the designated color register (C) 20b corresponding to the selected functional expression "Y2=2X", and when the graph/expression key 12e of the key-in unit 12 is operated in a state where only the function expression "Y2=2X" and its expression selection frame are displayed in blue, as shown in FIG. 4B, the graph/expression flag is changed to "1" since the expression display flag "0" is set at present in the graph/expression register G. Thus, as shown in FIG. 4C, data corresponding to the selected functional expression "Y2=2X" is displayed in blue in correspondence to the designated color data "2" set in the designated color register (C) 20b while graph data corresponding to the other function expressions "Y1=X$^2$" and "Y3=X−4" are displayed intact in black in dependence on the designated color data "1" set in the respective designated color registers (C) 20a and 20c (steps B6, B7, B19).

No graph of an expression where its designated color data is set at "0" is displayed. More particularly, in the function operation, by selecting the input functional expression with the cursor operation and changing the designated color data on the selected functional expression optionally with the color key 12b, the selected functional expression and its graph data are displayed in a color corresponding to the designated color data. Thus, the respective functional expressions and corresponding graph data are displayed very plainly.

Figure 5:
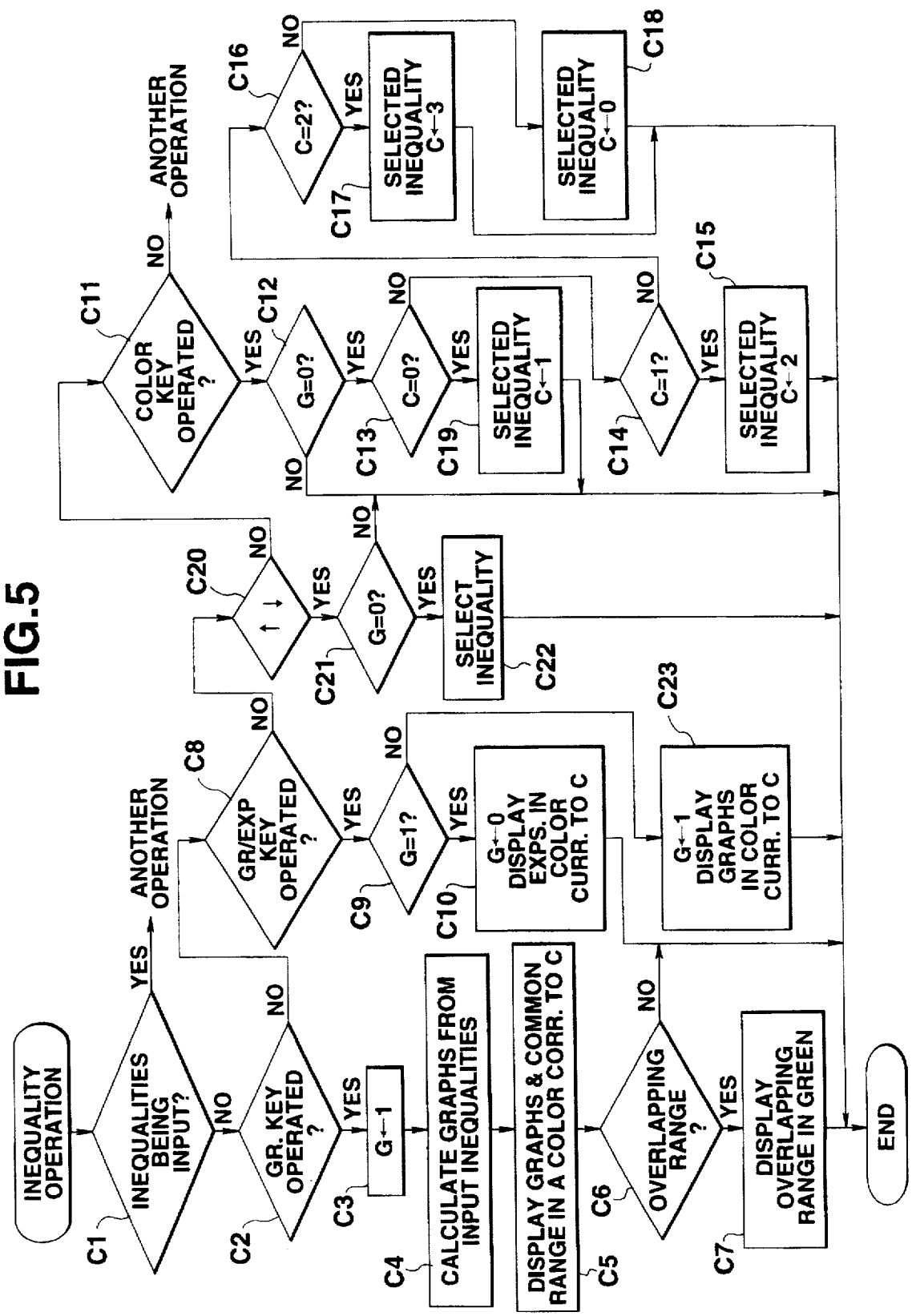
FIG. 5 is a flow chart indicative of an inequality operation performed by the computer.

FIG. 5 is a flow chart indicative of an inequality operation performed by the computer. FIG. 6 shows a display state corresponding to the key-in operation involved in the inequality operation performed by the computer.

When in the inequality operation the numeral and functional keys 12a of the key-in unit 12 are operated to input, for example, two functional inequalities "Y1≧X$^2$" and "Y2≦X", data on those two input functional inequalities are stored in the corresponding expression registers 19a and 19b of the RAM 14 (step C1, another operation). When the "graph" key 12d is then operated, a graph display flag "1" is set in the graph/expression flag register G (steps C1–C3).

Data "1" (black display) is first set in each of the designated color registers (C) 20a and 20b corresponding to the expression registers 19a and 19b, respectively. In response to this operation, graph data based on the respective two functional inequalities "Y1≧X$^2$" and "Y2≦X" stored in the expression registers 19a and 19b, respectively, are calculated by the CPU and extended as bit map data in the graph storage area 21 (step C4).

Thus, graph data corresponding to the respective functional inequalities "Y1≧X$^2$" and "Y2≦X" and their common effective range "X$^2$≦Y2≦X" are written together into the display register 18, all the displayed dot data is transferred intact to the color data memory 15 in accordance with display color "1" (black display) designated by the designated color registers (C) 20a and 20b, and then displayed in black graphs on the display 17 (step C5).

If there is a common or overlapping effective range "X$^2$≦Y2≦X" based on the two functional inequalities "Y1≧X$^2$" and "Y2≦X" among the graph data corresponding to those inequalities, display data corresponding to the overlapping range is transferred as green display to the color data memory 15, so that the graph data on the functional inequalities "Y1≧X$^2$" and "Y2≦X" is displayed in black on the display 17 and the overlapping effective range "X$^2$≦Y2≦X" in green (steps C6, C7).

When the "graph/expression" key 12e of the key-in unit 12 is operated at this point in time, it is determined that a graph display flag "1" is set at present in the graph/expression flag register G of the RAM 14. Thus, an expression display flag "0" is set in the graph/expression flag register G, data on the respective functional inequalities "Y1≧X$^2$" and "Y2≦X" is (1) written into the display register 18, (2) transferred intact to the color data memory 15 in accordance with a display color "1" (black display) designated by the designated color registers (C) 20a and 20b corresponding to those inequalities and (3) displayed in black on the display 17 (steps C8–C10).

When the color key 12g is operated to change the displayed designated color for the input first functional inequality "Y1≧X$^2$", it is confirmed on the basis of the graph/expression flag register G that the display state of the input expression is G=0 and it is determined that data "1" (black display) is set at present in the designated color register (C) 20a corresponding to the first functional inequality "Y1≧X$^2$". Thus, the designated color data in the designated color register "C" 20a is changed to "2" (blue display) (steps C11–C15).

Figure 6A:
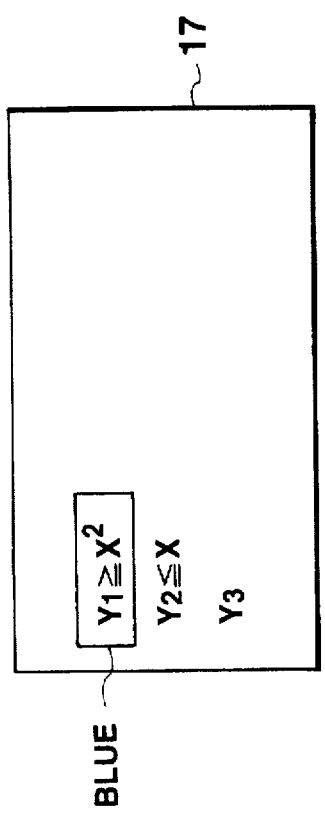
FIGS. 6A, B and C each display a display state corresponding to keying operations involved in the inequality operation performed by the computer.

Thus, of display data indicative of the two functional inequalities transferred to the color data memory 15 from the display register 18 and displayed, only the displayed dot data which constitute the first functional inequality "$Y1 \geq X^2$" and its expression selection frame is converted to data "2" (blue display), which is then transferred to the color data memory 15. Thus, as shown in FIG. 6A, the selected first functional inequality "$Y1 \geq X^2$" and its expression selection frame are displayed in blue on the display 17.

When the "color" key 12g of the key-in unit 12 is again operated, the designated color data set in the designated color register (C) 20a corresponding to the selected first functional inequality "$Y1 \geq X^2$" is determined to be neither "0" nor "1", but "2". Thus, the designated color data in the designated color register (C) 20a is changed to data "3" (red display), which is then set (steps C11–C17).

In this case, only the displayed dot data which constitute the selected first functional inequality "$Y1 \geq X^2$" and its expression selection frame is changed to data "3" (red display), which is then transferred to the color data memory 15, and the selected first functional inequality "$Y1 \geq X^2$" and its expression selection frame are display in red on the display 17.

Further, when the color key 12g of the key-in unit 12 is still again operated, the designated color data set in the designated color register (C) 20a corresponding to the selected first functional inequality "$Y1 \geq X^2$" is determined to be none of "0", "1" and "2". Thus, the designated color data in the designated color register (C) 20a is changed to data "0" (unlighted) and set (steps C11–C16, C18).

In this case, only the displayed dot data which constitutes the selected first functional inequality "$Y1 \geq X^2$" and its expression selection frame is converted to data "0" (unlighted), which is then transferred to the color data memory 15, and the first functional inequality "$Y1 \geq X^2$" and its expression selection frame are display in an inverted manner on the display 17

Further, when the "color" key 12g of the key-in unit 12 is still again operated, the designated color data set in the designated color register (C) 20a corresponding to the selected first functional inequality "$Y1 \geq X^2$" is determined to be "0" (unlighted). Thus, the designated color data in the designated color register (C) 20a is changed to data "1" (black display) and set (steps C11–C13, C19).

In this case, only the displayed dot data which constitutes the first functional inequality "$Y1 \geq X^2$" and its expression selection frame is again convert to data "1" (black display), which is then transferred to the color data memory 15, and the first functional inequality "$Y124 X^2$" and its expression selection frame are displayed in black on the display 17.

Each time the "color" key 12b is operated, the designated color data corresponding to the currently selected functional inequality is changed sequentially in order of "1" (black), "2" (blue), "3" (red), "0" (unlighted or inverted) and "1" (black), and its selection functional inequality and expression selection frame are changed and displayed in order of black, blue, inverted and black (steps C11–C19).

When in step B16 data "2" (blue display) is set in the designated color register (C) 20a corresponding to the selected first functional inequality "$Y1 \geq X^2$" and when the cursor key 12f is operated in a state where only the functional inequality "$Y1 \geq X^2$" and its expression selection frame are displayed in blue, as shown in FIG. 6A, it is confirmed on the basis of the graph/expression register G that the display state of the input expression is G=0. Thereafter, each time the cursor key is operated, data on an expression selection frame is moved from the display register 18 through the color data memory 15 such that the frame selectively encloses and displays one of the two functional inequalities "$Y124 X^2$" and "$Y223 X$" sequentially in this order. In this case, the inequality "$Y2 \leq X$" is selected (steps C20–C22).

When the "color" key 12g is twice operated to change the displayed designated color for the selected second functional inequality "$Y2 \leq X$", it is confirmed on the basis of the graph/expression flag register G that the display state of the input expression is G=0 and it is determined that data "2" (blue display) is set by the first operation of the color key 12g in the designated color register (C) 20b corresponding to the selected second functional inequality "$Y2 \leq X$". Thus, the designated color data in the designated color register "C" 20b is changed to "3" (red display), which is then set (steps C11–C17).

Figure 6B:
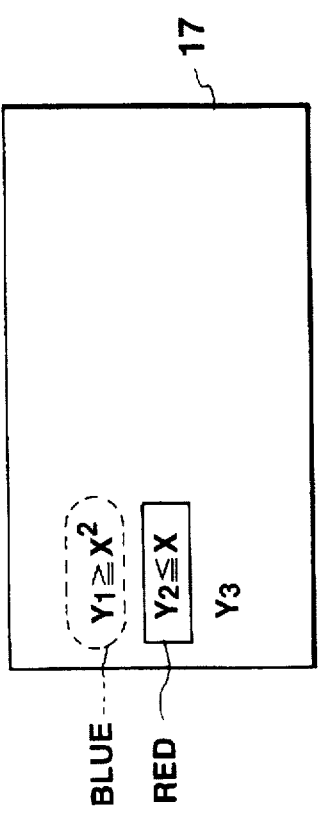

Thus, as shown in FIG. 6B, display data indicative of the first functional inequality "$Y1 \geq X^2$" transferred to the color data memory 15 from the display register 18 and displayed is converted to data "2" (blue display), which is then displayed in blue while displayed data on the cursor-selected second functional inequality "$Y2 \leq X$" and its expression selection frame is converted to "3" (red display,) which is then displayed in red.

Figure 6C:
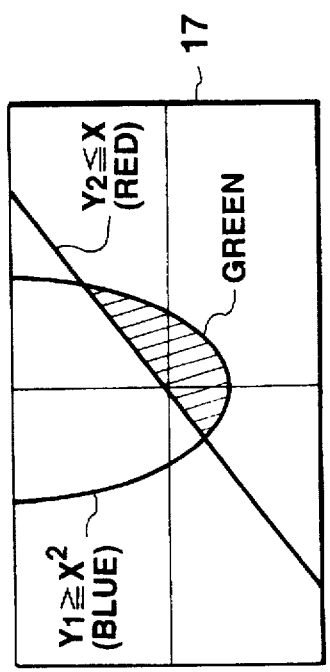

As shown in FIG. 6B, data "2" (blue display) is set in the designated color register (C) 20a corresponding to the first functional inequality "$Y1 \geq X^2$", which is then displayed in blue while data "3" (red display) is set in the designated color register (C) 20b corresponding to the second functional inequality "$Y2 \leq X$", which is then displayed in red. When the graph/expression key 12e of the key-in unit 12 is operated in such state, the graph/expression flag G is changed to "1" since the expression display flag "0" is set at present in the graph/expression register G. Thus, as shown in FIG. 6C, data corresponding to the first functional inequality "$Y1 \geq X^2$" is displayed in blue in correspondence to the designated color data "2" set in the designated color register (C) 20a while graph data corresponding to the second functional inequality "$Y2 \leq X$" is displayed in red in dependence on the designated color data "3" set in the designated color register (C) 20b, and an effective range "$X^2 \leq Y \leq X$" common to the respective functional inequality graph is displayed and held in green in step C7 (steps C8, C9, (23).

In the inequality operation, the input functional inequality is selected by the cursor operation and the "color" key 12g is operated to change the designated color data on the selected functional expression optionally. Thus, the selected functional inequality and its graph data is displayed in a color corresponding to the designated color data as well as the effective range common to the respective functional inequalities is displayed in green which is not present among the designated colors of the graph data. Thus, the respective functional inequalities, corresponding graph data, and the common effective range are displayed very plainly.

Thus, according to the graph display device, data on a plurality of functional expressions and functional inequalities input by the operation of the numeral and function keys 12a of the key-in unit 12 is stored in the expression registers 19a, 19b, ... of the RAM 14, and displayed on the display 17 through the color data memory 15 from the display register 18. When the cursor key 12f is operated to select a desired expression and the "color" key 12g is operated, displayed designated color data "1" (black) set beforehand in the designated color data C corresponding to the expression register where the selected expression is stored is changed to "2" (blue) or "3" (red), and the selected expression is displayed in its designated color. The functional expressions are graphed and displayed in the respective designated colors by the operation of the graph/expression key 12e, and the common effective range of the functional inequalities is displayed in a color different from the displayed color of the functional expressions. Thus, the respective graph data based on the functional expressions are displayed together on the display in different plain colors easy to view.

Alternatively, different display colors may be designated automatically for the respective input functional expressions and inequalities.

A second embodiment of the graph display device according to the present invention will be described with the drawings below.

Figure 7:
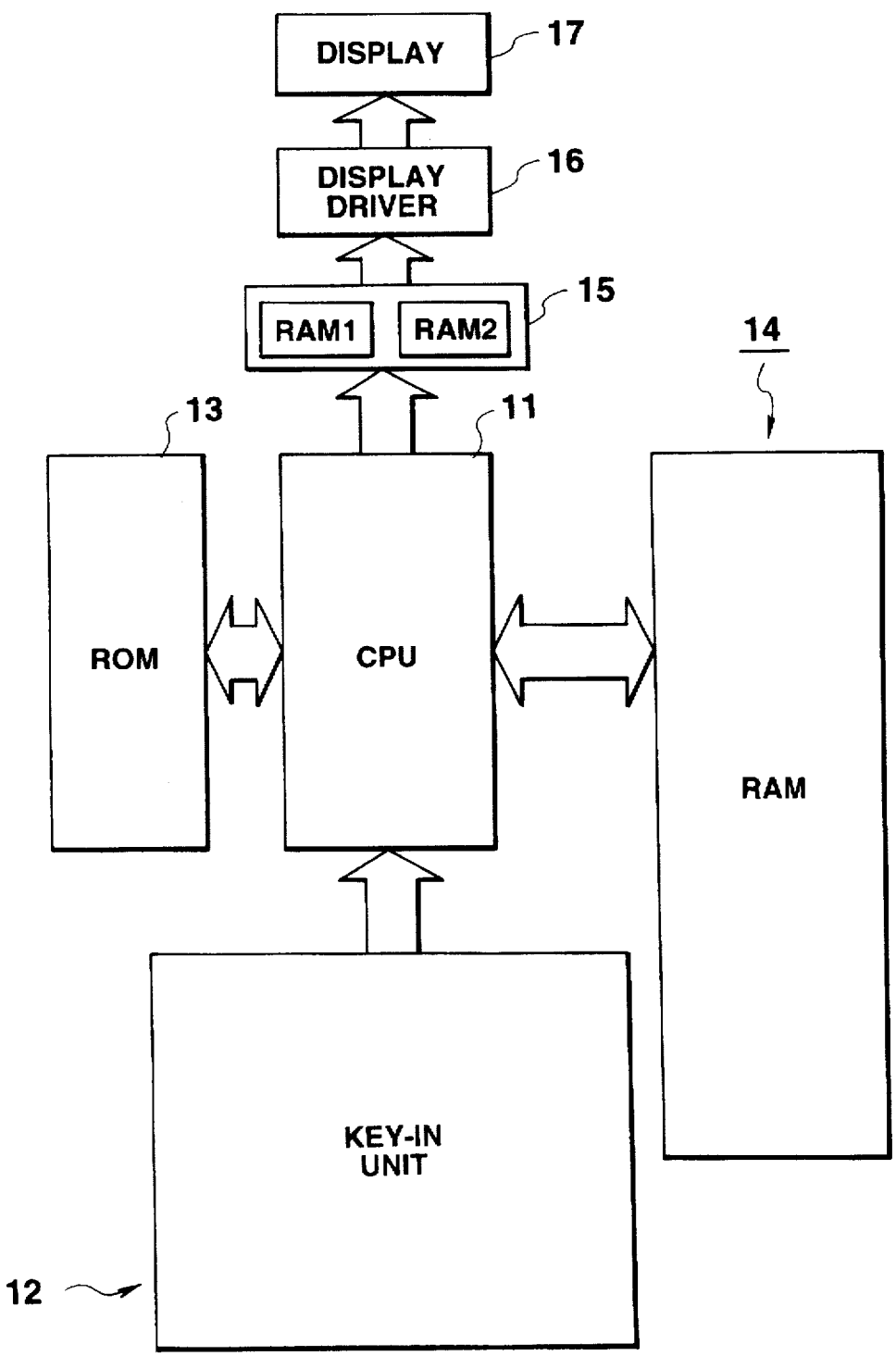
FIG. 7 is a block diagram indicative of the structure of an electronic circuit of a graph display device as an embodiment of the present invention.

FIG. 7 is a block diagram indicative of the structure of an electronic circuit of the graph display device.

The graph display device of this embodiment includes a color data memory 15 and RAMS 1 and 2. The ROM 13 contains display color ranking data "0", "1", "2" (a larger numerical value indicates a higher ranking position) indicative of the respective ranking positions of display colors "green", "blue" and "red" settable by the "color" key 12g. The remaining structure of this second embodiment is the same as that of the first embodiment and further description thereof will be omitted.

The color data memory 15 includes a green display register RAM 1 and a blue display register RAM 2 which each have an area of storage locations for display data corresponding in a one-to-one relationship to the display locations of the liquid crystal display 17. When the display data written in the display register 18 of the RAM 14 is transferred only to the green display register RAM 1, the display data is displayed in green on the display 17 through the display driver 16.

When the display data is transferred only to the blue display register RAM 2, the data is displayed in blue on the display 17 through the display driver 16.

When the display data is transferred simultaneously to the green and blue display registers RAM 1 and 2, the data is displayed in red on the display 17 through the display driver 16.

That is, of the display data written in the display register 18, the data whose display color is designated as green is transferred and stored to and in the RAM 1 alone, the data whose display color is designated as blue is transferred and stored to and in the RAM 2 alone, and the data whose display color is designated as red is transferred and stored to and in both the RAMS 1 and 2.

When display data set in different display colors overlap at the same coordinates on the display screen, only display data set in a display color having the highest display priority is displayed preferentially in the overlapping display data area on the basis of the display color ranking data stored beforehand in the ROM 13.

That portion of the display data set in a display color having a lower display priority which overlaps with display data set in a display color having a higher display priority is not stored in the color data memory 15 irrespective of the order of display.

When indicate data indicative of an inequality area of a functional inequality to be graphed and displayed overlaps with graphed display data of a second function expression, the graphed display data of the second function expression is displayed preferentially only in the overlapping portions of the inequality area irrespective of the display color ranking positions.

That is, the display data indicative of the inequality area of the functional inequality is not stored in its portion overlapping with the display data on the graph of the second function expression in the color data memory 15.

The operation of the graph display device of this embodiment will be described next.

Figure 8:
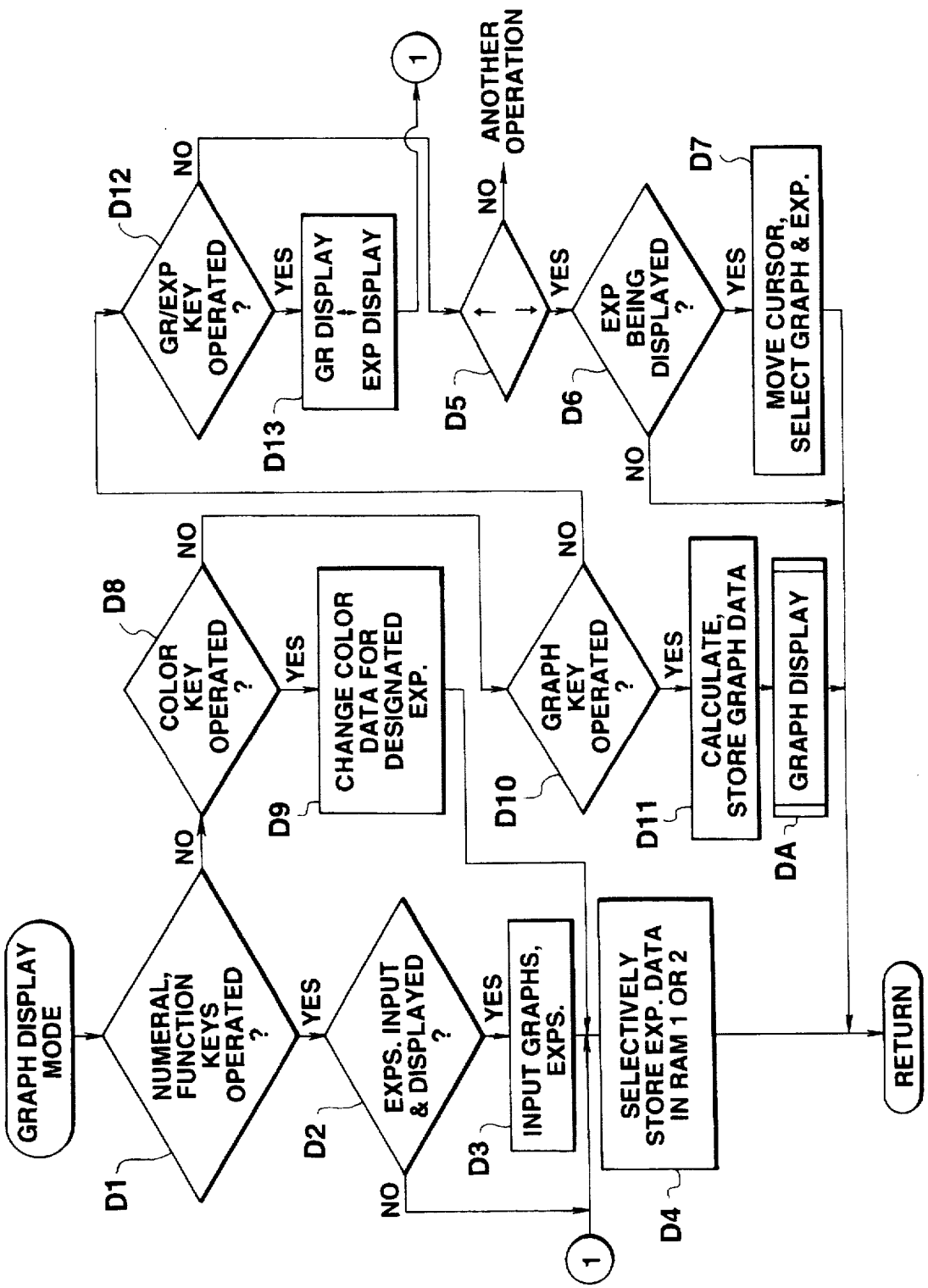
FIG. 8 is a flow chart indicative of the operation performed in a graph display mode in the graph display device.

FIG. 8 is a flow chart indicative of the operations performed in a graph display mode in the graphic display device.

Figure 9:
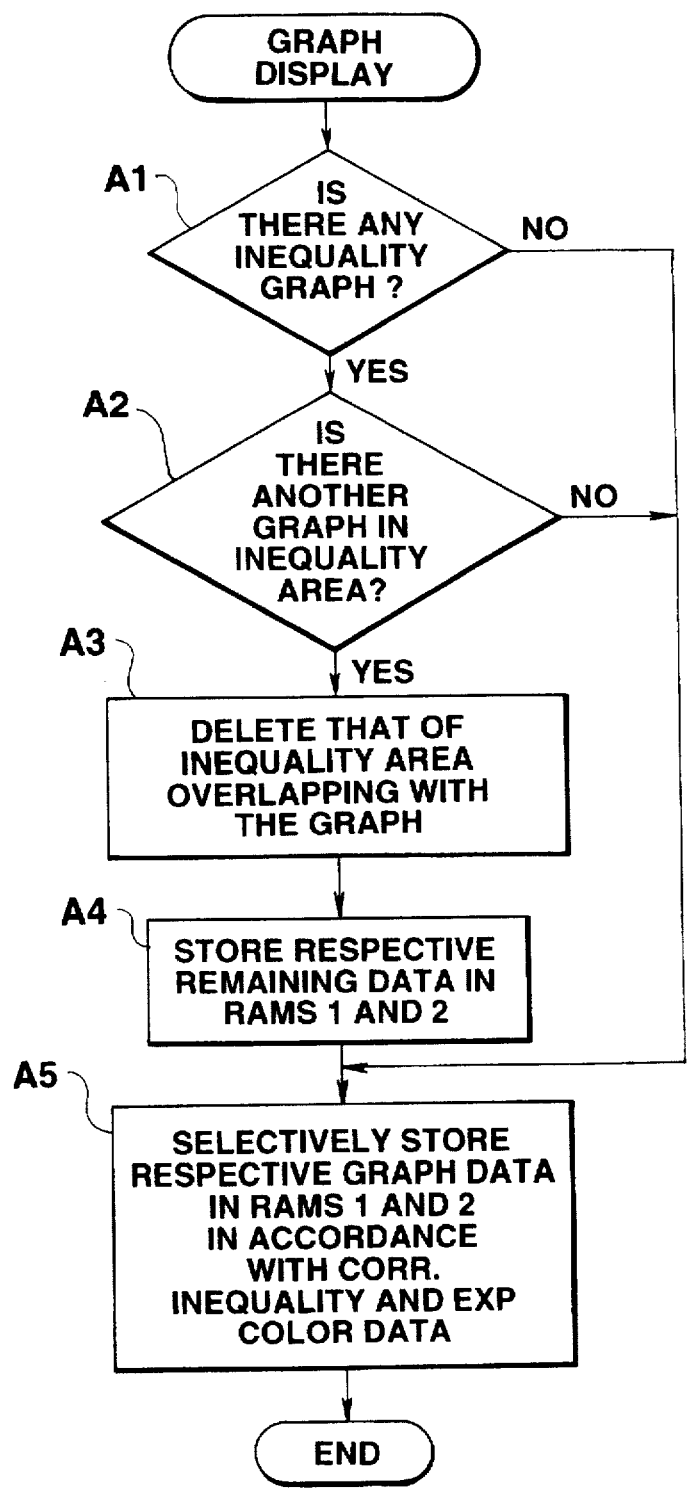
FIG. 9 is a flow chart indicative of the graph display operation performed in a graph display mode in the graph display device.

FIG. 9 is a flow chart indicative of a graph display process performed in the graph display mode in the graph display device.

FIGS. 10A, B, C, D and E each show a graph display state corresponding to a key-in operation performed in a graph display mode in the graph display device.

When the "mode" key 12b of the key-in unit 12 is operated to select a graph display mode, the CPU 11 is set in the graph display mode.

When the numeral/function keys 12a of the key-in unit 12 are operated to input functional expressions to be graphed, data on the expressions are sequentially stored in the expression registers 19a, 19b, .... of the RAM 14 (steps D1–D3).

In this case, display color data for "green" is set initially in the designated color registers 20a, 20b, .... corresponding to the functional expressions stored in the expression registers 19a, 19b, .....

When, for example, as shown in FIG. 10A, data on two functional expressions "Y1=X", "Y2=X$^2$–2" is input and stored in the expression registers 19a and 19b in this way, they are extended as displayed data in the display register 18, data on both the functional expressions is transferred to the RAM 1 of the color data memory 15 in accordance with displayed color data for "green" set initially in the designated color registers 20a and 20b corresponding to the expression registers 19a and 19b and displayed in green (step D4).

When the cursor key "" 12f is operated as shown in FIG. 10B to set, for example, display color of the first functional expression "Y1=X" at blue, it is determined that the expression is under display, and the cursor K on the display screen is moved from the position of the second functional expression to that of the first functional expression (steps D5–D7).

When the "color" key 12g is then operated, display color data stored in the designated color register 20a in correspondence to the first functional expression "Y1=X" designated by the cursor k is changed from green to blue, which is then set (steps D8, D9).

This causes the display data on the first functional expression transferred and stored to and in the RAM 1 of the data memory 15 to be deleted, and display data on that functional expression "Y1=X" is newly transferred to the RAM 2 and displayed in blue (step S4).

When the graph key 12d is operated as shown in FIG. 10C to graph and display the respective first and second functional expressions in a state where the display color data corresponding to the first functional expression "Y1=X" is set in blue and the display color data corresponding to the second functional expression "Y2=X$^2$–2" is set in green, graph data corresponding to the respective functional expressions are calculated and stored in the graph storage area 21 and the graph display process of FIG. 9 is started up (steps D10, D11, DA).

In the graph display process of FIG. 9, first, it is determined whether there is any inequality included among the functional expressions to be displayed, data on which is stored already in the expression registers 20a, 20b, .... (step A1).

Since in this case it is determined that no inequality is included in the functional expressions "Y1=X" and "Y2=X²–2" to be displayed, graph data corresponding to the first functional expression "Y1="X is extended as display data in the display register 18 and transferred to the RAM 2 of the color data memory 15 in accordance with the display color data "blue" set in the corresponding designated color register 20a and displayed in blue. Graph data corresponding to the second functional expression "Y2=X²–2" is extended as display data in the display register 18 and transferred to the RAM 2 of the color data memory 15 in accordance with the display color data "green" set in the corresponding designated color register 20b and displayed in green. In this case, there is a point where the two graph data intersect. Since the display color "green" of the second graph data has a lower display priority than the display color "blue" of the first graph data, the intersection of the second graph data with the first graph data is not transferred to the RAM 1 and the first graph data is displayed preferentially although the second graph data is displayed after the first graph data (steps A1, A5).

When the graph data of the display color "green" and the graph data of the display color "blue" are then displayed in this order, the data on the intersecting graph portion is deleted from the RAM 1.

When the "graph/expression" key 12e is operated to change the second functional expression "Y2=X+2" to an inequality, the display 17 is changed to a display state of the input expression. Thus, in this case, the first functional expression "Y1=X" is displayed in blue through the RAM 2 in accordance with its display color data "blue" and the second functional expression "Y2=X²–2" is displayed in green through the RAM 1 in accordance with the display color data "green" (FIG. 10B) (steps D12, D13, D4).

When the cursor key 12f is selectively operated to move the cursor k on the display screen to the position of "=" of the second functional expression "Y2=X²–2" and "≧" key included in the numeral/function keys 12a is operated, the second functional expression "Y2=X²–2" recorded in the expression register 19 is changed to the functional equality "Y2≧X²–2", data on which is then stored (steps D5–D7, D1–D3).

As shown in FIG. 10D, this causes the functional expressions "Y1=X" and the equality function expression "Y2≧4 X²–2", data on which is stored in the corresponding expression registers 20a, 20b to be extended as displayed data in the display register 18 and transferred to the RAMs 2 and 1 of the color data memory 15 and displayed in blue and green in accordance with the display color data "blue" and "green" set in the corresponding designated color registers 20a and 20b (step D4).

When the "graph" key 12d is operated as shown in FIG. 10E to graph and display the first functional expression "Y1=X" displayed in blue and the second functional inequality "Y2≧X²–2" displayed in green, the graph data corresponding to the respective functional expressions are calculated and stored in the graph storage area 21, and the graph display process of FIG. 9 is started up (steps D10, D11, DA).

This causes it to be first determined whether there is any inequality among functional expressions stored in the expression registers 19a and 19b, . . . , and to be displayed, in the graph display process of FIG. 9 (step A1).

In this case, since it is determined that there is an inequality among the functional expressions "Y1=X" and "Y2≧X²–2" to be displayed, it is first determined whether the graph data of the functional expression "Y1=X" overlaps with an inequality area of the graph data of the functional inequality "Y2≧X²–2" (steps A1, A2).

When it is determined that the graph of the functional expression "Y1=X" overlaps with the inequality area of the functional inequality "Y2≧X²–2" on the basis of the written coordinates of the graph data on the respective functional expressions stored in the graph storage area 21, data on that portion of the inequality area of the functional inequality "Y2≧X²–2" which overlaps with the graph of the functional expression "Y1=X" is deleted and the remaining inequality area data is (1) extended as display data in the display register 17, (2) transferred to both the RAMS 1 and 2 of the color data memory 15 and (3) displayed in red (steps A2–A4).

This causes the graph data corresponding to the first functional expression "Y1=X" to be extended as display data in the display register 18 and to be transferred to the RAM 2 of the color data memory 15 in accordance with the display color data "blue" set in the corresponding designated color register 20a and displayed in blue through the deleted portion of the inequality area data. In addition, graph data indicative of the inequality area of the functional inequality "Y2≧X²–2" in a box is extended as display data in the display register 18 and transferred to the RAM 1 of the color data memory 15 in accordance with the display color data "green" set in the corresponding designated color register 20a, and is displayed in green. In this case, since the set display color "green" of the second functional inequality "Y2≧X²–2" has a lower display priority than the set display color "blue" of the first functional expression "Y1=X", data on the graph portion surrounding the inequality area of the functional inequality and intersecting with the first graph is not transferred to the RAM 1 and the first graph data is displayed preferentially (step A5).

That is, the graph of the functional expression "Y1=X" is displayed preferentially in blue with the inequality area of the functional inequality "Y2≧X²–2" being displayed in red and its periphery being displayed in green.

Thus, according to the present graph display device, when (1) the numeral/functional keys 12a of the key-in unit 12 are operated to input/display a plurality of functional expressions to be graphed and to store data on those expressions in the expression registers 19a, 19b, . . . of the RAM 14, (2) the cursor key 12f and "color" key 12g are operated to select and set the display colors corresponding to the respective input expressions and to store data on those display colors in the designated color registers 20a, 20b, . . . , and (3) the graph key 12d is then operated to instruct the CPU 11 to graph and display the graph data, the graph data corresponding to the respective functional expressions is calculated and stored in the graph storage area 21, and the graph data where the set display colors "green", "blue" and "red" have increasing priorities in this order are stored preferentially in this order in the color data memory 15 on the basis of the priority data on the display colors stored beforehand in the ROM 13. Thus, even when the graph corresponding to the earlier input expression is displayed in blue and then the graph corresponding to the next input expression is overwritten and displayed in green, the intersecting portions of the respective graphs are displayed in blue and the graph corresponding to the earlier input expression is displayed emphatically.

When there is a functional inequality among the input expressions, data on which is stored in the expression registers 20a, 20b, . . . , and graph data on a second functional expression overlaps with an inequality area of the graph of the functional inequality, data on which is stored in the graph storage area 21, only that portion of the inequality area data which overlaps with the other functional expression graph data is deleted and the remaining graph data is displayed in red through the RAMS 1 and 2 of the data memory 15. In this case, the second functional expression graph data is preferentially displayed in green or blue through the RAM 1 or 2 in accordance with the set display color thereof. Thus, even when the graph on the earlier functional expression is displayed and a graph containing the inequality area corresponding to the next functional inequality is overwritten and displayed, the earlier functional expression graph is displayed in its set display color without being erased by the area of the next inequality functional expression.

Another preferred embodiment of the graph display device according to the present invention will be described next with reference to FIGS. 11A–11E which each illustrate a graph display state corresponding to a key operation performed in the graph display mode in the graph display device. When data on a functional expression to be graphed is input by operating the numeral/function key of the key-in unit, it is (1) stored in the expression register of the RAM, (2) extended as displayed data in the displayed register, (3) transferred to the color data memory, and (4) displayed in green as shown in FIG. 11A.

Thus, when, for example, data on two functional expressions "Y1=X+1" and "Y2=X$^2$" are input and stored in the expression registers and the "graph" key is then operated, graph data corresponding to the respective functional expressions are calculated and stored in the graph storage area.

This causes the graph data on those two functional expressions stored in the graph storage area to be extended as displayed data in the display register and transferred to the color data memory and as shown in FIG. 11B, displayed in green.

When the "trace" key is operated to perform a graph tracing operation, the graph data on the first functional expression "Y1=X+1" stored in the expression register is transferred to the color data memory and as shown in FIG. 11C, displayed distinctly in red.

This causes the cursor k to be displayed in red on the displayed red graph and the coordinates of the position of the cursor k to be displayed on the display screen.

When, for example, the downward feed key is operated, as shown in FIG. 11D, to change the graph to be traced to another in a state where the graph on the first functional expression "Y1=X+1" has been traced, red display of the traced graph is released and graph data on the second functional expression "Y2=X$^2$" designated by the operation of the downward feed key is transferred instead to the RAM 2 and displayed distinctly in red.

Simultaneously, the cursor k is displayed in red on the displayed red graph, the tracing of which is designated, and the coordinates of the position of the cursor k are displayed on the display screen.

When, for example, the rightward feed key is operated repeatedly, as shown in FIG. 11E, to move the cursor k on the graph on the second functional expression "Y2=X$^2$" displayed in red by the designation of the tracing, the cursor k on the graph is sequentially moved rightward in accordance with the key operation along the graph and the respective moving coordinates are updated and displayed.

When the graph tracing is performed in the graph display mode, the graph, the tracing of which is designated, is displayed distinctly in red. Thus, even when graphs of the functional expressions are displayed simultaneously, the traced graph is clearly recognized.

FIGS. 12A–12E each show a graph display state corresponding to a key operation performed in a graph enlargement mode of the graph display device. In FIG. 12, when the "mode" key of the key-in unit is operated to select a graph enlargement mode, graph enlargement mode data is stored in the mode register of the RAM and the CPU is set at the graph enlargement mode.

When data on a functional expression to be graphed is input by operating the key-in unit, it is (1) stored in the expression register of the RAM, (2) extended as displayed data in the displayed register, (3) transferred to the color data memory, and (4) displayed in green as shown in FIG. 12A.

Thus, when, for example, data on two functional expressions "Y1=X" and "Y2=–X+1" is input and in the expression register, and the "graph" key is then operated, graph data corresponding to the respective functional expressions are calculated and stored in the graph storage area.

This causes the graph data on those two functional expressions stored in the graph storage area to be extended as displayed data in the display register and transferred to an area of the color data memory corresponding to the left-half display screen and as shown in FIG. 12B, and displayed in green on the left half of the display screen.

When the cursor keys are selectively combined and operated, as shown in FIG. 12C, to designate in a box the enlargement range of the graph displayed on the left-hand half of the display, the cursor k displayed on the left half area of the display is moved in any direction.

When the "enter" key is operated in a state where the cursor k has been moved to the starting point of the desired graph enlargement range by the moving operation of the cursor on the display, data on the coordinates of the position of the cursor k is stored in the RAM as the coordinates of the starting point of the box indicative of the graph enlargement range.

Thereafter, when the cursor k is further moved to the ending point of the desired graph enlargement range on the display, as shown in FIG. 12D, the box indicative of the graph enlargement range is displayed. When the "enter" key is operated, data on the coordinates of the position of the cursor k is additionally stored in the RAM as the coordinates of the end of the box indicative of the graph enlargement range and two points as the starting and ending coordinates of the box are designated.

As shown in FIG. 12E, this causes only that of the displayed graph data in the box to be newly transferred to the color data memory from the display register and displayed distinctly in red on the basis of the starting and ending coordinates of the box indicative of the graph enlargement range stored in the RAM.

This causes the graph data enclosed in the box to be (1) enlarged and the resulting enlarged graph data is extended as displayed data in the display register, (2) transferred simultaneously to the area of the color data memory corresponding to the right-hand half of the display screen, and (3) displayed in the same color (red) as the graph display color in the box indicative of the enlargement range on the right-hand half area of the display screen.

When in the graph enlargement mode a range, to be enlarged, of the graph displayed on the left-hand half area of the display screen is designated in an enclosing box, only that portion of the graph in the box is distinctly displayed in red and the enlarged graph portion is displayed in red next to the box in the right-hand half area of the display. Thus, even when the enlarged designated range is small, the enlarged graph in the designated range and the next displayed enlarged graph are clearly confirmed.

FIGS. 13A–13C each show a graph display state corresponding to a key operation performed in a dynamic graph mode of the graph display device. When the "mode" key of the key-in unit is operated to select a dynamic graph mode, dynamic graph mode data is stored in the mode register of the RAM and the CPU is set at the dynamic graph mode.

When the key-in unit is operated to input data on a functional expression to be dynamically graphed, for example, as "Y1=AX$^2$", as shown in FIG. 13A, a coefficient value setting display screen in which the starting/ending ones of a numerical value (defining a range of change of the numerical value) to be substituted into a coefficient "A" of the input function "Y1=AX$^2$", and an interval at which the numerical value changes are input is extended as displayed data in the displayed register, and displayed on the display, as shown in FIG. 13B.

The numeral key is then operated to set the starting and ending values of the coefficient "A" and its interval of change at "1", "4" and "1", respectively, and display them.

When the "graph" key operated to display the dynamic graph in such state, graph data corresponding to four functional expressions "Y1=X$^2$", "Y1=2X$^2$", "Y1=3X$^2$", "Y1=4X$^2$" obtained by substituting the numerals "1", "2", "3" and "4", respectively, to the coefficient "A" in accordance with those set conditions are sequentially calculated and stored in the graph data register 14d.

When those processes are completed, all the graph data is extended in the display register, and transferred and stored to and in the color data memory.

This causes four different graphs for the respective coefficient values "A" transferred to the color data memory to be displayed in green on the display, as shown in FIG. 13C. This causes the respective graph data to be sequentially transferred, rewritten and stored to and in the red display area of the color data register at intervals of a given time. Thus, all graphs indicative of the respective functional expressions, to the coefficient "A" of which the different numerical values are substituted, are displayed together and the respective graphs are sequentially selected and displayed in red at intervals of a given time.

The displayed state of the dynamic graphs based on the selection of the display color is maintained until some data is keyed in.

Figures 14A, 14B:
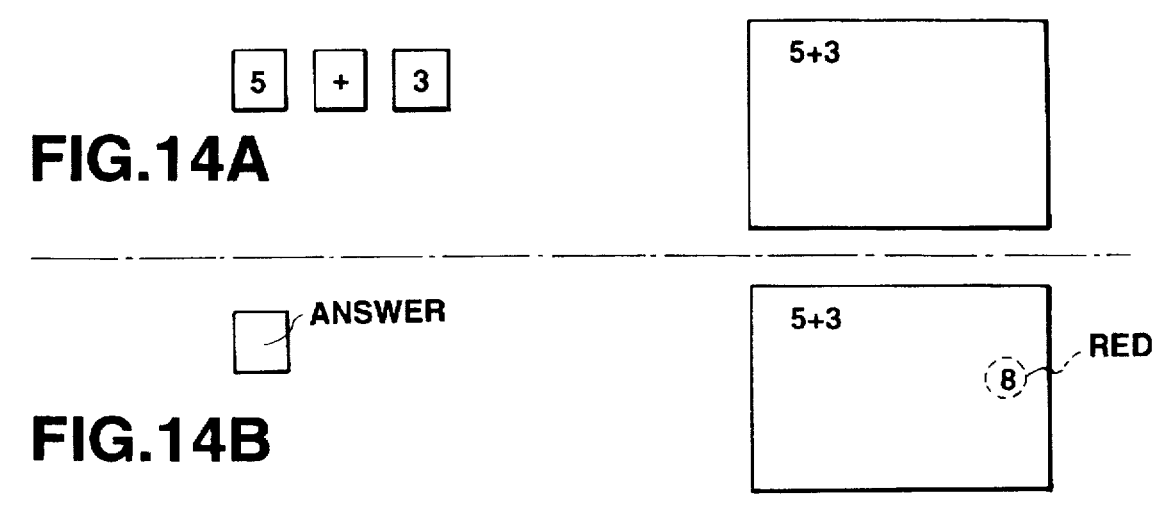

When the conditions of the numerical range and interval of change of the coefficient of the input functional expressions are set in the dynamic graph mode, graphs on the respective functional expressions, into which the respective different coefficient values are substituted, are displayed together and the respective graphs are sequentially selected and dynamically displayed in red. Thus, the moves of the graphs are easily recognized in the whole range of change of the coefficient values. FIGS. 14A–14B each show a display state corresponding to a key-in operation involved in a general calculation process performed by the graph display device.

When the key-in unit is operated to input data on a desired calculation expression, for example, as "5+3", data on the input expression is stored in the expression register of the RAM and written as displayed data in the display register.

In this case, data "1" (black indication) is set initially in the designated color register corresponding to the expression register, so that the input expression "5+3" for the displayed data written in the display register is transferred intact to the color data memory and displayed in black on the display, as shown in FIG. 14A.

When the "answer" key of the key-in unit is operated, the calculation of the input expression "5+3", data on which is stored in the expression register is performed by the CPU 11 and data on the resulting answer "8" is additionally written into the display register and displayed dot data on the answer "8" is converted by the CPU from "1" to "3" (red display), which is then transferred to the color data memory and displayed in red on the display, as shown in FIG. 14B.

Since in the calculation process the input expression is displayed in black and the result of the calculation is displayed in red, the input expression and the result of the calculation are displayed in a very distinctly plain manner. The present invention may be carried out in various other forms without departing from the main features thereof.

What is claimed is:

1. A graph display device comprising:
    an expression input section for inputting functional expression data;
    an expression color setting section for setting a display color for the functional expression data input by said expression input section;
    an expression display section for displaying the input functional expression data in the display color set by said expression color setting section;
    a graph producing section for producing a graph for the functional expression data input by said expression input section based on the input functional expression data; and
    a graph display section for displaying the graph produced by said graph producing section in the same display color as that set for the functional expression data.

2. A graph display device according to claim 1, wherein said expression color setting section comprises a select color setting section for setting a plurality of different display colors, including one color for each of a plurality of functional expression data input by said expression input section.

3. A graph display device according to claim 1, further comprising an area display section for displaying a second area, other than a first area in which the graph is displayed by said graph display section, in a display color other than that set by said expression color setting section, said area display section being operable responsive to said expression input section inputting inequality data as the functional expression data.

4. A graph display device according to claim 3, wherein said area display section further comprises a graph recognizing and displaying section, responsive to a first graph being displayed in an overlapping manner with a second graph, for preferentially displaying overlapping portions of the first and second graphs with corresponding portions of the second graph preferentially.

5. A graph display device according to claim 1, further comprising:
    a display color storage section in which a plurality of display colors and a like number of display priorities are stored in corresponding relationship, said display priorities representing a priority with which respective ones of the plurality of display colors are displayed;
    an expression color setting section for setting a selected display color among from the plurality of display colors stored in said display color storage section, and for setting the selected color for input functional expression data; and a priority display section, operable responsive to said graph display device displaying two intersecting graphs, for displaying intersecting portions of the two intersecting graphs in the selected color for the input functional expression data of the one of the intersecting graphs which has a higher display priority.

6. A recording medium having recorded thereon a graph display program for operating a computer as:

expression data means for displaying input functional expression data in a set display color;

graph producing means for producing a graph for the input functional expression data based on the input functional expression data; and graph display means for displaying the graph produced by said graph producing means in the same display color as that set for the functional expression data.

7. A graph display method comprising the steps of:

setting a display color for input functional expression data;

displaying the input functional expression data in the set display color;

producing a graph for the input functional expression data input based on the input functional expression data; and displaying the produced graph in the same display color as that set for the functional expression data.

* * * * *